United States Patent
Ogawa (10) Patent No.: US 12,492,904 B2
(45) Date of Patent: Dec. 9, 2025

(54) SELF LOCALIZATION METHOD, CONTROL APPARATUS, AND NON-TRANSITORY COMPUTER READABLE RECORDING MEDIUM

(71) Applicant: TOYOTA JIDOSHA KABUSHIKI KAISHA, Toyota (JP)

(72) Inventor: Chuya Ogawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 180 days.

(21) Appl. No.: 18/239,529

(22) Filed: Aug. 29, 2023

(65) Prior Publication Data

US 2024/0077314 A1  Mar. 7, 2024

(30) Foreign Application Priority Data

Sep. 1, 2022  (JP) .................... 2022-139036

(51) Int. Cl.
*G01C 21/16* (2006.01)

(52) U.S. Cl.
CPC .................... *G01C 21/16* (2013.01)

(58) Field of Classification Search
CPC .......... G01C 21/16; G01C 5/00; G01C 21/20; G01C 21/005
See application file for complete search history.

(56) References Cited

U.S. PATENT DOCUMENTS

| | | |
|---|---|---|
| 10,048,699 B2 | 8/2018 | Inoue et al. |
| 10,310,508 B2 | 6/2019 | Kunisa et al. |
| 10,493,987 B2 | 12/2019 | Ohsugi |
| 10,515,458 B1 * | 12/2019 | Yakimenko ............... G06T 7/33 |
| 10,845,814 B2 | 11/2020 | Funayama et al. |
| 10,890,453 B2 | 1/2021 | Tateishi |
| 10,953,886 B2 | 3/2021 | Suwabe et al. |
| 11,092,442 B2 | 8/2021 | Mori et al. |
| 11,156,466 B2 | 10/2021 | Morimoto |
| 11,300,415 B2 | 4/2022 | Ishida |
| 2020/0293066 A1 | 9/2020 | Shibata |
| 2022/0180578 A1 * | 6/2022 | Peterson ............... G06T 11/206 |
| 2023/0219567 A1 | 7/2023 | Iwai et al. |

FOREIGN PATENT DOCUMENTS

| | | |
|---|---|---|
| JP | 2014-173916 A | 9/2014 |
| JP | 6900029 B2 * | 7/2021 |
| JP | 2023-102099 A | 7/2023 |
| WO | 2019/058505 A1 | 3/2019 |

\* cited by examiner

*Primary Examiner* — Anne Marie Antonucci
*Assistant Examiner* — Jewel A Kuntz
(74) *Attorney, Agent, or Firm* — Dinsmore & Shohl LLP (57) ABSTRACT

A self-localization method according to the present disclosure includes the following first to fourth steps. The first step is acquiring terrain data in which a position and an elevation of a ground surface on a traveling area of the vehicle are managed. The second step is acquiring time series data of acceleration in a vertical direction of the vehicle. The third step is estimating an altitude of the vehicle based on an initial altitude of the vehicle and the time series data of acceleration. The fourth step is estimating a vehicle position based on the position of the ground surface at which the elevation of the ground surface approximates the estimated altitude of the vehicle.

4 Claims, 6 Drawing Sheets

SELF LOCALIZATION METHOD, CONTROL APPARATUS, AND NON-TRANSITORY COMPUTER READABLE RECORDING MEDIUM

CROSS-REFERENCE TO RELATED APPLICATIONS

The present application claims priority under 35 U.S.C. § 119 to Japanese Patent Application No. 2022-139036, filed Sep. 1, 2022, the contents of which application are incorporated herein by reference in their entirety.

BACKGROUND

Technical Field

The present disclosure relates to a technique for performing self-localization of a vehicle.

Background Art

Patent Literature 1 discloses a method including:
detecting an altitude, a current position, and a speed of an aircraft;
estimating a future position of the aircraft based on the detected current position and speed of the aircraft; and
controlling the altitude of the aircraft based on the estimated future position of the aircraft, the detected altitude of the aircraft, and predetermined terrain data.

LIST OF RELATED ART

Patent Literature 1: WO 2019/058505 A1

SUMMARY

In control of a moving body such as a vehicle or an aircraft, it is generally required to know a current position. Patent Literature 1 discloses that an altitude, a current position, and a speed of an aircraft are acquired using GNSS (Global Navigation Satellite System) data.

The inventor according to the present disclosure considers controlling vehicle travel in an environment where GNSS data cannot be received and in terrain where slipping or getting stuck is likely to occur. In such a case, it is required to perform self-localization of the vehicle without using the GNSS data. Conventionally, when GNSS data is not used, it has been considered to perform self-localization based on a detected vehicle speed or acceleration in a horizontal direction of the vehicle. However, in terrain where slipping or getting stuck is likely to occur, there is a possibility that the vehicle speed and the acceleration of the vehicle which do not actually contribute to movement may be detected. Therefore, the accuracy of self-localization may not be sufficiently ensured.

In view of the above problem, an object of the present disclosure is to provide a technique capable of performing self-localization of a vehicle with high accuracy even when the vehicle travels in an environment where GNSS data cannot be received and in terrain where slipping or getting stuck is likely to occur.

A first aspect of the present disclosure relates to a self-localization method for a vehicle.

The self-localization method according to the first aspect includes:
acquiring terrain data in which a position and an elevation of a ground surface on a traveling area of the vehicle;
acquiring time series data of acceleration in a vertical direction of the vehicle;
estimating an altitude of the vehicle based on an initial altitude of the vehicle and the time series data of acceleration; and
estimating a vehicle position based on the position of the ground surface at which the elevation of the ground surface approximates the estimated altitude of the vehicle.

A second aspect of the present disclosure relates to a control apparatus for a vehicle.

The control apparatus according to the second aspect is configured to execute:
acquiring terrain data in which a position and an elevation of a ground surface on a traveling area of the vehicle;
acquiring time series data of acceleration in a vertical direction of the vehicle;
estimating an altitude of the vehicle based on an initial altitude of the vehicle and the time series data of acceleration; and
estimating a vehicle position based on the position of the ground surface at which the elevation of the ground surface approximates the estimated altitude of the vehicle.

A third aspect of the present disclosure relates to a self-localization program for self-localization for a vehicle.

The self-localization program according to the third aspect, when executed by a computer, causes the computer to execute:
acquiring terrain data in which a position and an elevation of a ground surface on a traveling area of the vehicle;
acquiring time series data of acceleration in a vertical direction of the vehicle;
estimating an altitude of the vehicle based on an initial altitude of the vehicle and the time series data of acceleration; and
estimating a vehicle position based on the position of the ground surface at which the elevation of the ground surface approximates the estimated altitude of the vehicle.

According to the present disclosure, the altitude of the vehicle is estimated based on the initial altitude of the vehicle and the time series data of acceleration in the vertical direction. Then, the vehicle position is estimated based on the position of the ground surface at which the elevation of the ground surface approximates the estimated altitude of the vehicle in the terrain data. Thus, according to the present disclosure, it is possible to perform self-localization of the vehicle without using GNSS data. Further, according to the present disclosure, the vehicle speed and the acceleration in the horizontal direction of the vehicle have little influence on the self-localization result. As a result, the self-localization can be performed with high accuracy even when the vehicle travels on terrain where slipping or getting stuck is likely to occur.

DETAILED DESCRIPTION

Hereinafter, an embodiment will be described with reference to the drawings.

1. Configuration

Figure 1:
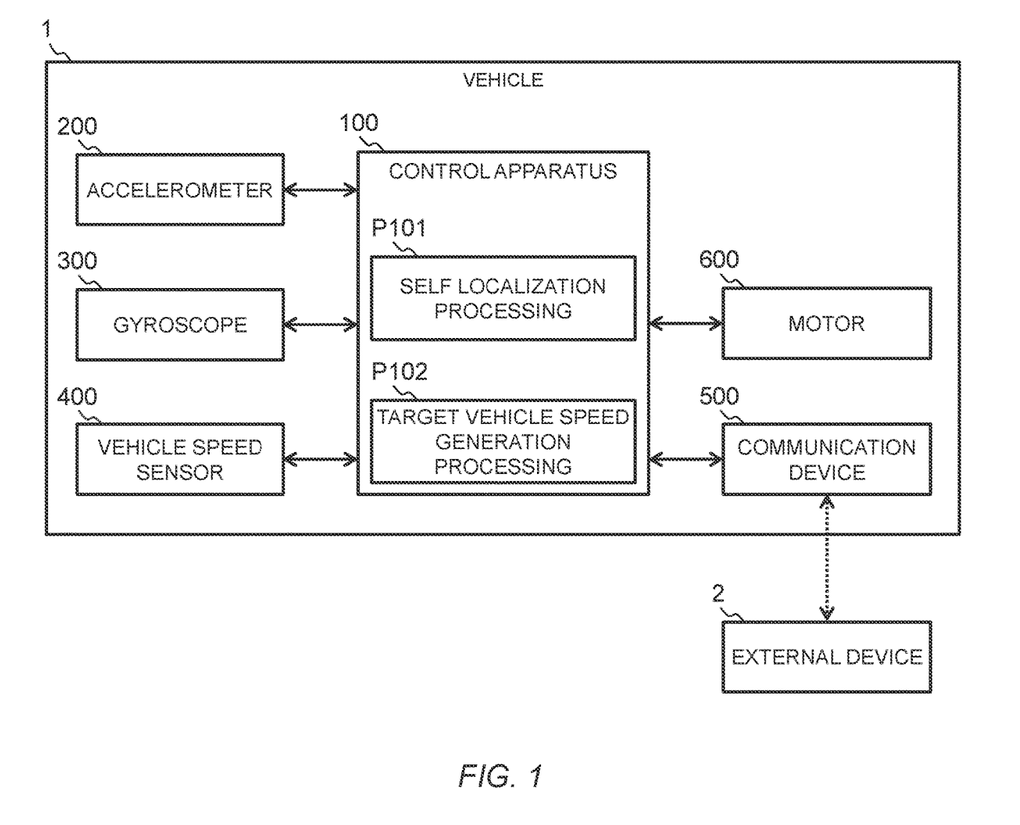
FIG. 1 is a block diagram showing a configuration of a vehicle according to the present embodiment.

The self-localization method according to the present embodiment performs self-localization of a vehicle. FIG. 1 is a block diagram showing a configuration of a vehicle 1 to which the self-localization method according to the present embodiment is applied.

The vehicle 1 includes a control apparatus 100, an accelerometer 200, a gyroscope 300, a vehicle speed sensor 400, a communication device 500, and a motor 600. The control apparatus 100 is configured to communicate information with the accelerometer 200, the gyroscope 300, the vehicle speed sensor 400, the communication device 500, and the motor 600. For example, the control apparatus 100 is connected to these apparatuses via an in-vehicle network configured by a cable harness or the like.

The accelerometer 200 is a sensor that detects and outputs the acceleration of the vehicle 1 in the vehicle coordinate system. Accelerometer 200 detects at least the acceleration of vehicle 1 in the vertical direction (hereinafter also referred to as "Z-axis acceleration"). However, the accelerometer 200 may be configured to be able to detect the acceleration of the vehicle 1 in the horizontal direction. The detection information output from the accelerometer 200 is transmitted to the control apparatus 100.

The gyroscope 300 is a sensor that detects and outputs angular velocities of three axes in the vehicle coordinate system of the vehicle 1. That is, the gyroscope 300 detects the angular velocity of the roll axis of the vehicle 1, the angular velocity of the pitch axis of the vehicle 1, and the angular velocity of the yaw axis of the vehicle 1. The detection information output from the gyroscope 300 is transmitted to the control apparatus 100.

The vehicle speed sensor 400 is a sensor that detects and outputs the vehicle speed of the vehicle 1. In particular, the vehicle speed sensor 400 may be a sensor that detects the vehicle speed from the wheel speed of the vehicle 1. In this case, the vehicle speed sensor 400 may be configured to output the wheel speed of the vehicle 1. The detection information output from the vehicle speed sensor 400 is transmitted to the control apparatus 100.

The communication device 500 communicates with the external device 2 of the vehicle 1 to transmit and receive information. Examples of the external device 2 with which the communication device 500 communicates include another vehicle, a control device that remotely controls the vehicle 1, a data server, and the like. The information received by the communication device 500 is transmitted to the control apparatus 100.

The control apparatus 100 executes a process related to control of the vehicle 1 based on the acquired information.

In particular, the control apparatus 100 is configured to perform a self-localization processing P101 and a target vehicle speed generation processing P102.

In the self-localization processing P101, the control apparatus 100 performs self-localization of the vehicle 1 and obtains a self-localization result. The self-localization result gives the current position of vehicle 1. For example, the self-localization result gives the current position of the vehicle 1 by coordinates such as longitude and latitude. The control apparatus 100 may be configured to transmit a self-localization result obtained by executing the self-localization processing P101 to the external device 2 via the communication device 500.

In the target vehicle speed generation processing P102, the control apparatus 100 generates a target vehicle speed of the vehicle 1. For example, the control apparatus 100 generates the target vehicle speed of the vehicle 1 so that the vehicle 1 reaches the target position. In this case, the control apparatus 100 may be configured to acquire the target position input in the external device 2 via the communication device 500. In this case, the target vehicle speed generation processing P102 refers to the self-localization result obtained by executing the self-localization processing P101. That is, in the target vehicle speed generation processing P102, the control apparatus 100 generates the target vehicle speed in accordance with the distance between the self-localization result and the target position. In this case, the control apparatus 100 sets the target vehicle speed to 0 when the vehicle 1 reaches the target position.

In the target vehicle speed generation processing P102, the control apparatus 100 may be configured to generate the target vehicle speed input in the external device 2. For example, the external device 2 is a control device that remotely controls the vehicle 1, and the control apparatus 100 is configured to acquire the target vehicle speed input in the control device (external device 2) via the communication device 500. In this case, the self-location self-localization result obtained by the execution of the self-localization processing P101 can be used as information for the operator of the control device to determine the remote operation. Therefore, in this case, the control apparatus 100 may be configured to transmit the self-location estimation result obtained by executing the self-localization processing P101 to the control apparatus (external device 2) via the communication device 500.

The target vehicle speed generated by the execution of the target vehicle speed generation processing P102 is transmitted from the control apparatus 100 to the motor 600.

The motor 600 operates in accordance with the target vehicle speed transmitted from the control apparatus 100 to drive the vehicle 1. Typically, motor 600 includes an electric motor connected to a wheel or a crawler belt that provides a traveling function of vehicle 1, and a drive circuit that controls driving of the electric motor. In this case, the motor 600 controls driving of the electric motor so that the vehicle 1 reaches the target vehicle speed transmitted from the control apparatus 100. The motor 600 operates in accordance with the target vehicle speed transmitted from the control apparatus 100, whereby control of the vehicle 1 by the control apparatus 100 is realized.

As described above, the vehicle 1 according to the present embodiment is controlled to travel by the control apparatus 100. The vehicle 1 according to the present embodiment may be configured such that steering control is further performed by the control apparatus 100. For example, the control apparatus 100 may be configured to further execute a process of generating a target steering of the vehicle 1, and the vehicle 1 may be configured to further include a steering mechanism that operates in accordance with the target steering transmitted from the control apparatus 100.

Figure 2:
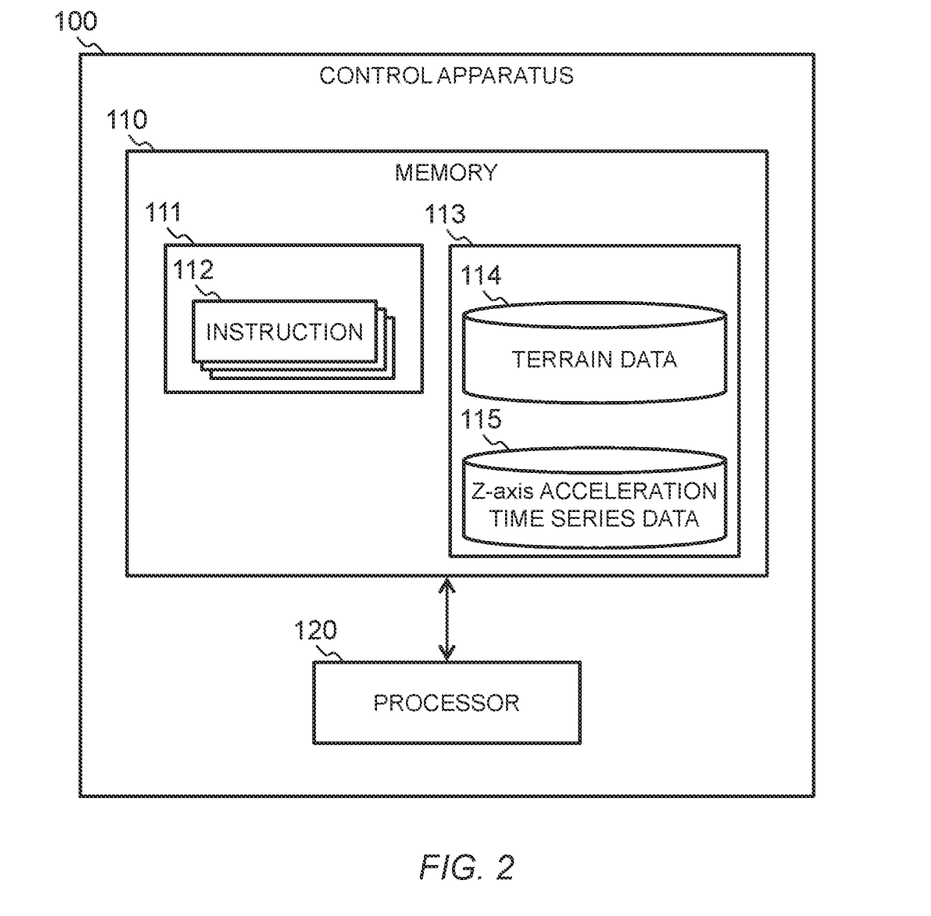
FIG. 2 is a block diagram showing a configuration of a control apparatus according to the present embodiment.

Next, the configuration of the control apparatus 100 will be described with reference to FIG. 2. The control apparatus 100 is a computer including a memory 110 and a processor 120.

The memory 110 is coupled to the processor 120, and stores a plurality of instructions 112 executable by the processor 120 and various data 113 required for execution of processing.

The instructions 112 are provided by the computer program 111. The instructions 112 are also configured to cause the processor 120 to perform a self-localization processing P101 and a target vehicle speed generation processing P102. That is, execution of the self-localization processing P101 and the target vehicle speed generation processing P102 is realized by the processor 120 operating in accordance with the plurality of instructions 112.

The data 113 includes information acquired by the control apparatus 100 and parameter information of the computer program 111. In particular, the data 113 includes terrain data 114 and Z-axis acceleration time series data 115.

The terrain data 114 manages the position and elevation of the ground surface for the traveling area of the vehicle 1. The terrain data 114 is, for example, information obtained by an investigation performed in advance. For example, the terrain data 114 can be generated based on image data captured from above or distance measurement data measured from above. The terrain data 114 may be stored in the memory 110 in advance, or may be information acquired by the control apparatus 100 from the external device 2 (for example, a data server) via the communication device 500. The traveling area of the vehicle 1 is a range in which the vehicle 1 is likely to travel. The traveling area of the vehicle 1 may be determined in advance in accordance with an environment to which the vehicle 1 according to the present embodiment is applied, or may be set or changed in accordance with a control state of the vehicle 1 or a request received from the external device 2. When the traveling area of the vehicle 1 is set or changed, the control apparatus 100 may be configured to acquire the terrain data 114 corresponding to the set or changed traveling area of the vehicle 1 from the external device 2 via the communication device 500.

Figure 3A:
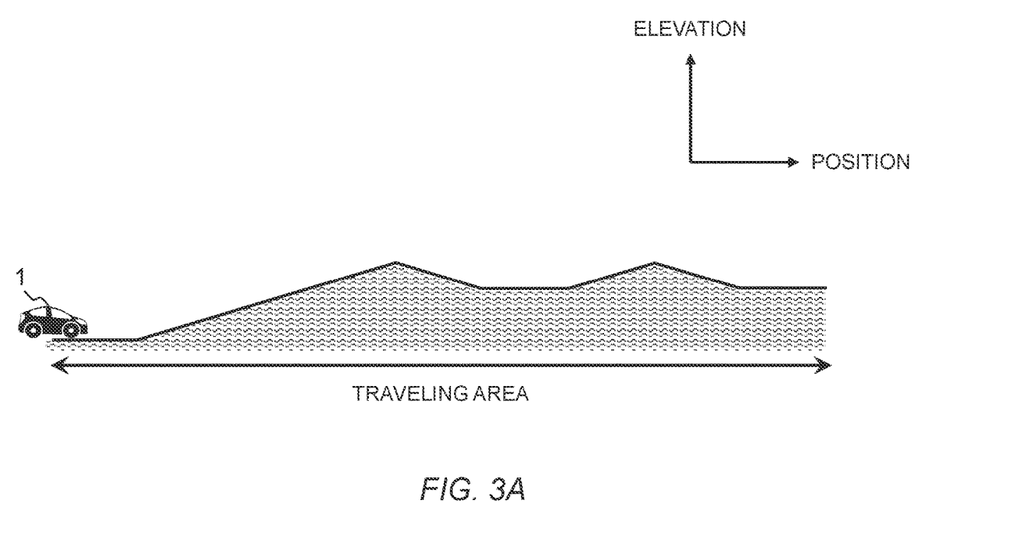
FIG. 3A is a conceptual diagram for explaining terrain data.
Figure 3B:
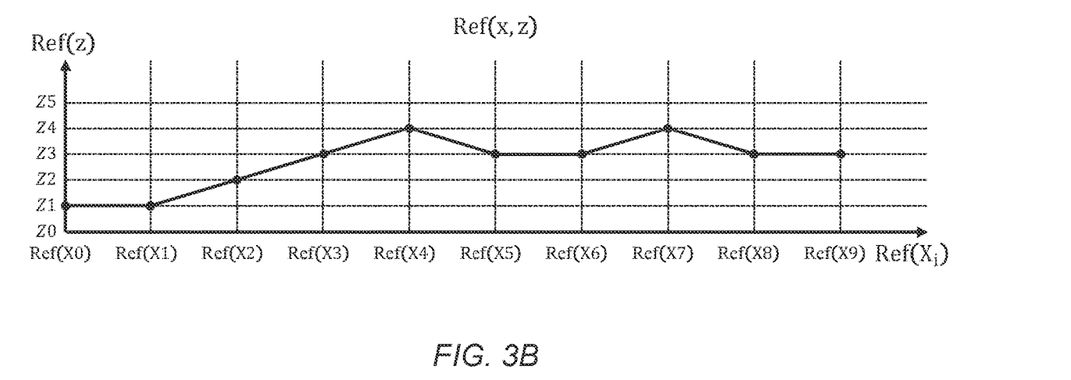
FIG. 3B is a conceptual diagram for explaining terrain data.

The terrain data 114 will be described with reference to FIGS. 3A and 3B. FIG. 3A is a conceptual diagram showing an example of the terrain on which vehicle 1 travels and the traveling area of vehicle 1, and FIG. 3B shows an example of the terrain data 114 (Ref (x, z)) in the traveling area of vehicle 1 shown in FIG. 3A. FIGS. 3A and 3B illustrate a case where the traveling area of the vehicle 1 is one dimensional and the terrain data 114 is two-dimensional data. For example, the case where vehicle 1 travels along a certain traveling route or the case where the traveling direction of vehicle 1 is fixed. However, the traveling area of the vehicle 1 may be two dimensional, and the terrain data 114 may be three-dimensional data.

In the terrain data 114 (Ref (x, z)) illustrated in FIG. 3B, the elevation Ref (z) of the ground surface with respect to the position Ref (Xi) (I=1, 2,) of the ground surface is illustrated in a graph. For example, the elevation of the ground surface relative to the position Ref (X2) of the ground surface is Z2. As such, the processor 120 may obtain elevation of the ground surface with respect to the position of the ground surface from the terrain data 114.

Refer to FIG. 2 again. The Z-axis acceleration time series data 115 is time series data of Z-axis acceleration detected by the accelerometer 200. The control apparatus 100 may configure the Z-axis acceleration time series data 115 by sequentially storing the Z-axis acceleration transmitted from the accelerometer 200 in the memory 110. In particular, it is desirable that the control apparatus 100 holds the Z-axis acceleration time series data 115 from the initial position at which the vehicle 1 starts traveling to the end of the control of the vehicle 1.

As described above, the vehicle 1 according to the present embodiment can be configured.

2. Processing

Hereinafter, processing executed by the control apparatus 100 will be described. The self-localization method according to the present embodiment is implemented by a self-localization processing P101 executed by the control apparatus 100.

Figure 4:
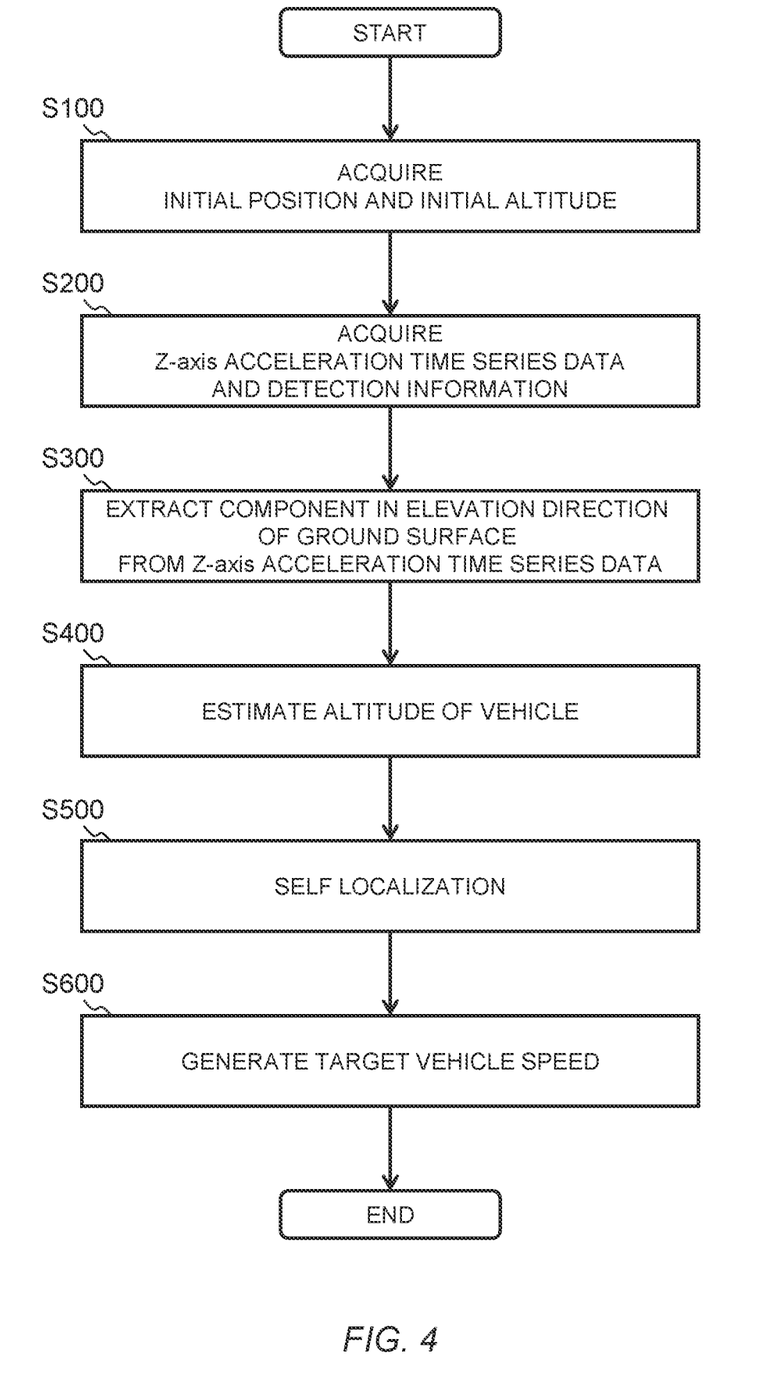
FIG. 4 is a flowchart showing processes executed by the control apparatus according to the present embodiment.

FIG. 4 is a flowchart illustrating a process executed by the control apparatus 100, more specifically, a process executed by the processor 120. The flowchart shown in FIG. 4 starts with the start of the operation of vehicle 1, for example, and is repeatedly executed at predetermined intervals. Note that, in the flowchart shown in FIG. 4, the step S100 and step S500 are executed in the self-localization processing P101, and the process related to step S600 is executed in the target vehicle speed generation processing P102.

In step S100, the control apparatus 100 acquires an initial position and an initial altitude of the vehicle 1 in the terrain data 114. For example, when a start point at which the vehicle 1 starts traveling is determined, the control apparatus 100 may acquire the position and the elevation of the ground surface of the predetermined start point managed in advance as the data 113 as the initial position and the initial altitude. Alternatively, the control apparatus 100 may acquire the position and elevation of the ground surface of the point where the vehicle 1 is located, which are acquired from the external device 2, as the initial position and the initial altitude. Note that the control apparatus 100 may skip step S100 when repeatedly executing the flowchart shown in FIG. 4 again.

In step S200, the control apparatus 100 acquires the Z-axis acceleration time series data 115 and the detection information of the sensor. This can be done by the processor 120 referencing the data 113. The detection information of the sensor includes information on the angular velocities of the three axes of vehicle 1 and information on the vehicle speed (or wheel speed) of vehicle 1.

In step S300, the control apparatus 100 extracts components in the elevation direction of the ground surface of the Z-axis acceleration time series data 115 acquired in step S200. For example, the control apparatus 100 calculates the vehicle attitude of the vehicle 1 based on the angular velocities of the three axes of the vehicle 1. Then, the component in the elevation direction of the ground surface of the Z-axis acceleration time series data 115 is calculated based on the argument between the calculated vehicle attitude and the elevation direction of the ground surface. Further, the control apparatus 100 may be configured to perform a removal operation of the gravitational acceleration of the celestial body with respect to the component in the elevation direction of the ground surface.

In step S400, the control apparatus 100 estimates the altitude of the vehicle 1 based on the initial altitude acquired in step S100 and the component in the elevation direction of the ground surface of the Z-axis acceleration time series data 115 calculated in step S300. For example, the control apparatus 100 estimates the altitude of the vehicle 1 by numerically integrating the component in the elevation direction of the ground surface of the Z-axis acceleration time series data 115 with the elevation of the ground surface indicated by the initial altitude as a base point. The altitude of the vehicle 1 is the position of the vehicle 1 in the elevation direction of the ground surface. Typically, the altitude of the vehicle 1 is a height measured in a vertical direction from a reference point on the ground surface. In this case, the reference point of the ground surface may be a point at which elevation of the ground surface is 0 in the terrain data 114.

In step S500, the control apparatus 100 performs self-localization of the vehicle 1 by comparing the altitude of the vehicle 1 estimated in step S400 with the terrain data 114. More specifically, the control apparatus 100 may estimate the position of the ground surface approximate to the altitude of the vehicle 1 in which the elevation of the ground surface is estimated in the terrain data 114 as the position of the vehicle 1.

In particular, in step S500, the control apparatus 100 may be configured to calculate the movement amount of the vehicle 1 from the initial position or the position of the vehicle 1 estimated in the previous processing based on the vehicle speed (or the wheel speed) of the vehicle 1. Here, the movement amount may be a scalar value indicating how far the vehicle 1 has moved forward or backward from the initial position or the position of the vehicle 1 estimated in the previous processing. Then, the control apparatus 100 may be configured to estimate, as the position of the vehicle 1, the position of the ground surface whose elevation is approximate to the estimated altitude of the vehicle 1 in the vicinity of a point away from the initial position or the position of the ground surface corresponding to the position of the vehicle 1 estimated in the previous processing by the movement amount in the terrain data 114. With this configuration, it is possible to reduce the range in which the control apparatus 100 refers to the terrain data 114 in the processing related to step S500. Consequently, it is possible to reduce the processing load of the control apparatus 100 and improve the accuracy of self-localization.

When the traveling area of the vehicle 1 is two dimensional and the terrain data 114 is three-dimensional data, the point away from the position of the corresponding ground surface by the movement amount may be a circumference having the position of the corresponding ground surface as a center and the movement amount as a radius.

In addition, control apparatus 100 may be configured to convert the estimated position of vehicle 1 into a self-localization result. For example, when the terrain data 114 is two-dimensional data and the position of the vehicle 1 is estimated in one dimension, the control apparatus 100 may be configured to convert the position of the vehicle 1 estimated in one dimension into a two dimensional position and set the two dimensional position as the self-localization result.

In step S600, the control apparatus 100 generates a target vehicle speed of the vehicle 1. The control apparatus 100 may be configured to set the target vehicle speed to 0 when the self-localization is not completed in the predetermined period in step S500 or when the stop request of the vehicle 1 is issued from the external device 2.

After step S600, the current process is terminated. The target vehicle speed generated in step S600 is transmitted from the control apparatus 100 to the motor 600.

As described above, the processing is executed by the control apparatus 100. As described above, the self-localization method according to the present embodiment is realized by the processing executed by the control apparatus.

3. Practical Example

Hereinafter, a practical example of the self-localization method according to the present embodiment will be described with reference to FIG. 5. FIGS. 5A and 5B show a practical example in which vehicle 1 travels on the terrain shown in FIGS. 3A and 3B and vehicle 1 starts traveling at time t0. FIGS. 5A and 5B illustrate a graph of the altitude of the vehicle 1 estimated at each time and a graph of the terrain data 114.

Figure 5A:
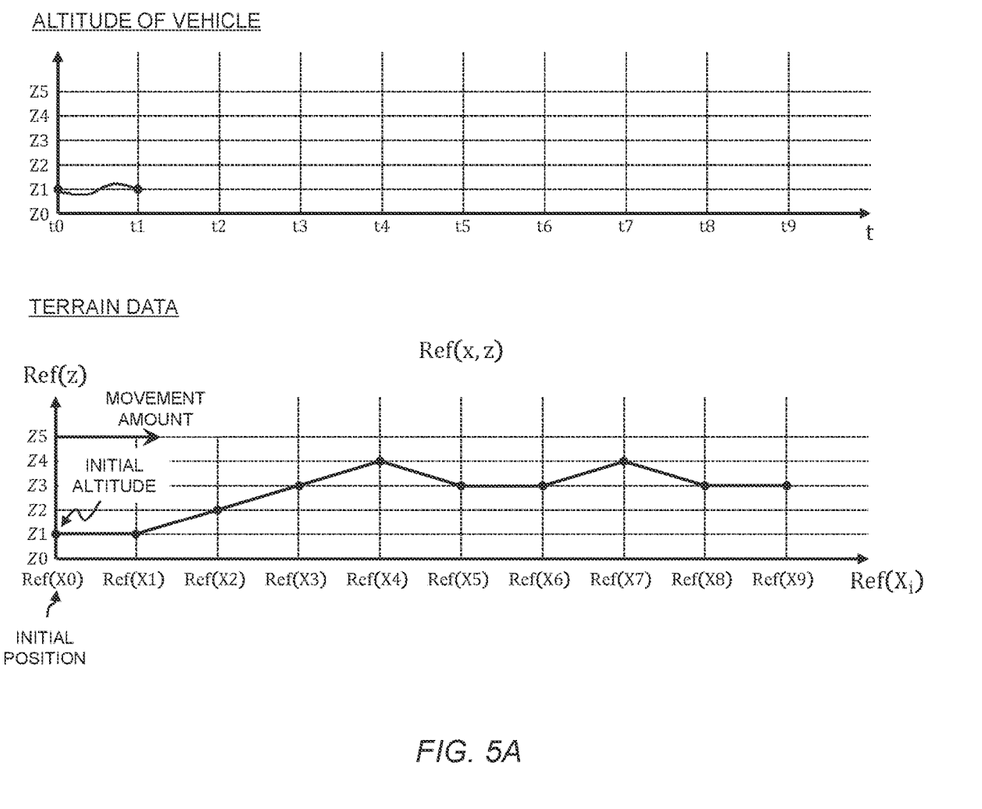
FIG. 5A is a conceptual diagram for explaining an practical example of a self-localization method according to the present embodiment.

First, reference is made to FIG. 5A. FIG. 5A illustrates a case in which the self-localization of vehicle 1 is performed at time t1. In FIG. 5A, the initial position and initial altitude of vehicle 1 (the position and altitude of vehicle 1 at time t0) in the terrain data 114 are Ref (X0) and Z1.

At time t1, the altitude of vehicle 1 is estimated to be Z1. Further, the amount of movement is calculated as indicated by the terrain data 114 in FIG. 5A. In FIG. 5A, position Ref (Xi) of the ground surface in which the elevation Ref (z) of the ground surface approximates the altitude Z1 of vehicle 1 in the vicinity of a point separated from the initial position by the movement amount is Ref (X1). Therefore, according to the self-localization method of the present embodiment, the position of vehicle 1 at time t1 is estimated to be Ref (X1).

Figure 5B:
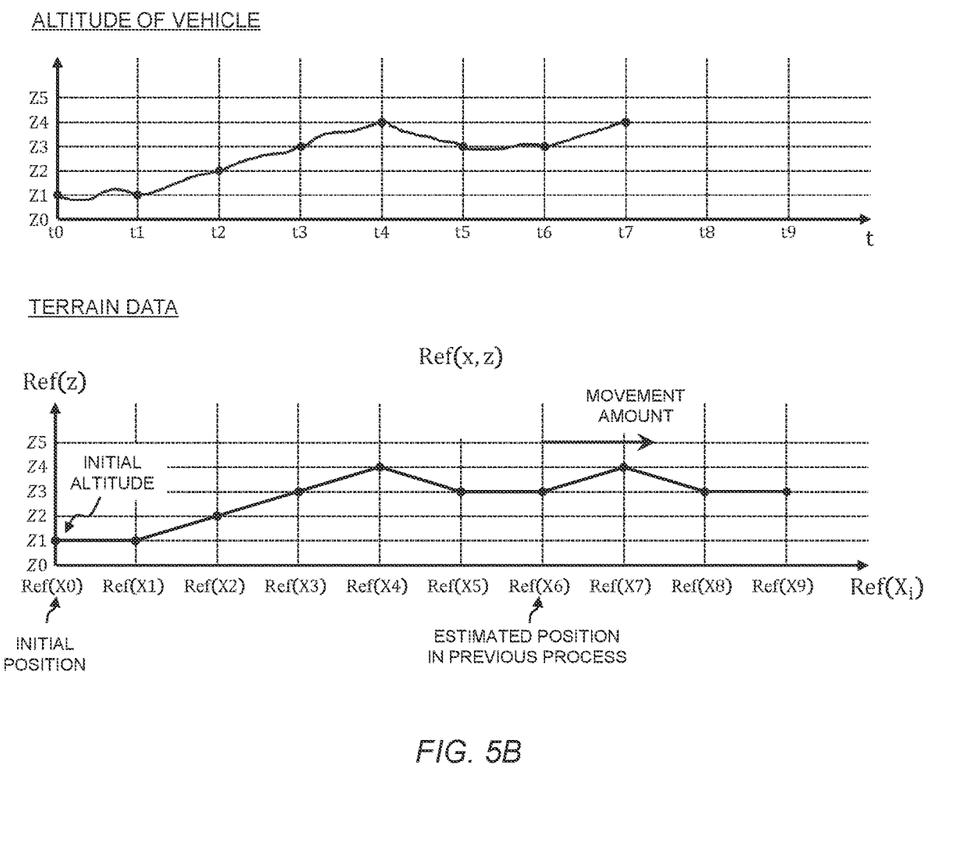
FIG. 5B is a conceptual diagram for explaining an practical example of the self-localization method according to the present embodiment.

Next, reference is made to FIG. 5B. FIG. 5B illustrates a case in which the self-localization of vehicle 1 is performed at time t7. Here, in FIG. 5B, the position of vehicle 1 estimated in the previous processing (the position of vehicle 1 at time t6) is Ref (X6).

At time t7, the altitude of vehicle 1 is estimated to be Z4. Further, the amount of movement is calculated as indicated by the terrain data 114 in FIG. 5B. In FIG. 5B, position Ref (Xi) of the ground surface in which the elevation Ref (z) of the ground surface approximates the altitude Z4 of the vehicle 1 in the vicinity of a point away from the position of the vehicle 1 estimated in the previous processing by the movement amount is Ref (X7). Therefore, according to the self-localization method of the present embodiment, the position of vehicle 1 at time t7 is estimated to be Ref (X7).

4. Effect

As described above, according to the present embodiment, the altitude of vehicle 1 is estimated based on the initial altitude of vehicle 1 and the Z-axis acceleration time series data 115. Then, the position of the ground surface approximate to the altitude of the vehicle 1 for which the elevation of the ground surface is estimated in the terrain data 114 is estimated as the position of the vehicle 1. As described above, according to the present embodiment, it is possible to estimate the self-localization of vehicle 1 without using GNSS data. Further, according to the present embodiment, the vehicle speed and the acceleration of the vehicle 1 in the horizontal direction hardly affect the self-localization result. As a result, it is possible to perform accurate self-localization even when vehicle 1 travels on a terrain on which slipping or stacking is likely to occur.

The self-localization method according to the present embodiment is particularly effectively applied in an environment in which GNSS data cannot be received and in a case where the vehicle 1 travels on a terrain in which a slip or a stack easily occurs and which has a height difference.

Note that the self-localization method according to the present embodiment can be utilized independently of the control of the vehicle 1. For example, it can be utilized as a system for displaying the position of the vehicle 1. In addition, the self-localization method according to the present embodiment can be used in combination with another self-localization method, or can be used for redundancy of another self-localization method. For example, the self-localization method according to the present embodiment can be used as a preliminary self-localization method when the accelerometer 200 cannot normally detect the acceleration of the vehicle 1 in the horizontal direction.

What is claimed is:

1. A self-localization method for a vehicle, including:
   acquiring terrain data in which a position and an elevation of a ground surface on a traveling area of the vehicle are managed, the traveling area corresponding to a range in which the vehicle travels and including terrain indicative of where the vehicle is slipping or getting stuck, the traveling area being changed in accordance with a control state of the vehicle;
   acquiring time series data of acceleration in a vertical direction of the vehicle;
   estimating an altitude of the vehicle based on an initial altitude of the vehicle and the time series data of acceleration;
   estimating a vehicle position based on the position of the ground surface at which the elevation of the ground surface approximates the estimated altitude of the vehicle;
   generating a self-localization-result obtained by executing self-localization processing;
   generating a target vehicle speed in accordance with a distance between the self-localization result and a target position, and setting the target vehicle speed to zero in response to the self-localization not being completed in a predetermined period;
   transmitting the target vehicle speed to a motor of the vehicle; and
   controlling driving of the motor to travel in accordance with the target vehicle speed so that the vehicle reaches the target position.

2. The self-localization method according to claim 1, further including calculating a movement amount of the vehicle from an initial position of the vehicle or the vehicle position estimated in a previous process based on a vehicle speed or a wheel speed of the vehicle, wherein
   the estimating the vehicle position includes estimating the vehicle position to be the position of the ground surface at which the elevation of the ground surface approximates the estimated altitude of the vehicle in a vicinity of a point away, by the movement amount, from the initial position or the vehicle position estimated in the previous process.

3. A control apparatus for a vehicle configured to execute:
   acquiring terrain data in which a position and an elevation of a ground surface on a traveling area of the vehicle are managed, the traveling area corresponding to a range in which the vehicle travels and including terrain indicative of where the vehicle is slipping or getting stuck, the traveling area being changed in accordance with a control state of the vehicle;
   acquiring time series data of acceleration in a vertical direction of the vehicle;
   estimating an altitude of the vehicle based on an initial altitude of the vehicle and the time series data of acceleration;
   estimating a vehicle position based on the position of the ground surface at which the elevation of the ground surface approximates the estimated altitude of the vehicle;
   generating a self-localization-result obtained by executing self-localization processing;
   generating a target vehicle speed in accordance with a distance between the self-localization result and a target position, and setting the target vehicle speed to zero in response to the self-localization not being completed in a predetermined period;
   transmitting the target vehicle speed to a motor of the vehicle; and
   controlling driving of the motor to travel in accordance with the target vehicle speed so that the vehicle reaches the target position.

4. A non-transitory computer readable recording medium on which a computer program for self-localization for a vehicle is recorded, the computer program, when executed by a computer, causing the computer to execute:
   acquiring terrain data in which a position and an elevation of a ground surface on a traveling area of the vehicle are managed, the traveling area corresponding to a range in which the vehicle travels and including terrain indicative of where the vehicle is slipping or getting stuck, the traveling area being changed in accordance with a control state of the vehicle;
   acquiring time series data of acceleration in a vertical direction of the vehicle;
   estimating an altitude of the vehicle based on an initial altitude of the vehicle and the time series data of acceleration;
   estimating a vehicle position based on the position of the ground surface at which the elevation of the ground surface approximates the estimated altitude of the vehicle;
   generating a self-localization-result obtained by executing self-localization processing;
   generating a target vehicle speed in accordance with a distance between the self-localization result and a target position, and setting the target vehicle speed to zero in response to the self-localization not being completed in a predetermined period;
   transmitting the target vehicle speed to a motor of the vehicle; and
   controlling driving of the motor to travel in accordance with the target vehicle speed so that the vehicle reaches the target position.

* * * * *